United States Patent
Kizer et al.

(10) Patent No.: US 9,385,898 B2
(45) Date of Patent: Jul. 5, 2016

(54) PIPELINED PROGRAMMABLE FEED FORWARD EQUALIZER (FFE) FOR A RECEIVER

(71) Applicant: Avago Technologies General IP (Singapore) Pte. Ltd., Singapore (SG)

(72) Inventors: Jade Michael Kizer, Windsor, CO (US); Robert B. Roze, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 92 days.

(21) Appl. No.: 13/905,766

(22) Filed: May 30, 2013

(65) Prior Publication Data

US 2014/0355663 A1    Dec. 4, 2014

(51) Int. Cl.
  H04L 25/03    (2006.01)
(52) U.S. Cl.
  CPC .................. *H04L 25/03885* (2013.01)
(58) Field of Classification Search
  CPC ............ H03D 3/24; H03M 7/30; H03M 7/38; H03M 1/38; H03M 7/00; H03K 5/19; H03K 5/159; H04B 1/38; H04B 15/00; H04B 17/00; H04L 27/01; H04L 25/03; H04L 25/03885
  USPC .................. 327/100, 147, 156; 341/150, 161; 345/219, 229, 232, 233, 236
  See application file for complete search history.

(56) References Cited

U.S. PATENT DOCUMENTS

| | | | |
|---|---|---|---|
| 6,061,279 A * | 5/2000 | Toda ..................... | G11C 27/026 365/149 |
| 7,539,243 B1 * | 5/2009 | Toifl et al. ..................... | 375/229 |
| 8,135,100 B2 | 3/2012 | Beukema et al. | |
| 8,300,685 B2 | 10/2012 | Chen et al. | |
| 8,686,888 B2 * | 4/2014 | Chou et al. ..................... | 341/161 |
| 8,774,321 B2 * | 7/2014 | Sunaga et al. ................. | 375/324 |
| 2006/0067396 A1 * | 3/2006 | Christensen ....... | H03H 21/0001 375/232 |
| 2012/0201289 A1 | 8/2012 | Abdalla et al. | |
| 2013/0336378 A1 * | 12/2013 | Agrawal et al. ................ | 375/233 |
| 2014/0169440 A1 * | 6/2014 | Kotagiri ............. | H04L 27/0002 375/233 |
| 2014/0232464 A1 * | 8/2014 | Song ....................... | H04L 27/01 330/258 |

FOREIGN PATENT DOCUMENTS

WO    2011156503 A1    12/2011

OTHER PUBLICATIONS

Guilar et al.; A Passive Switched-Capacitor Finite-Impulse-Response Equalizer; IEEE Journal of Solid-State Circuits; vol. 42, No. 2; pp. 400-409; 2007.
Prof. David Johns; Equalization; University of Toronto, pp. 1-35; 1997.

* cited by examiner

*Primary Examiner* — Sam K Ahn
*Assistant Examiner* — Shawkat M Ali

(57) ABSTRACT

A programmable feed forward equalizer (FFE) includes a plurality of unit cells, each unit cell comprising a capacitive element coupled to an input connection by a first switch and coupled to an output connection by a second switch. The FFE also comprises clock logic configured to control the first switch and the second switch so that a selected voltage signal is applied to the capacitive element at a selected time such that the selected voltage signal defines a capacitance of the capacitive element, the clock logic causing the second switch to couple the capacitive element to the output connection so as to apply the selected voltage signal as a filter coefficient to a summing element.

20 Claims, 5 Drawing Sheets

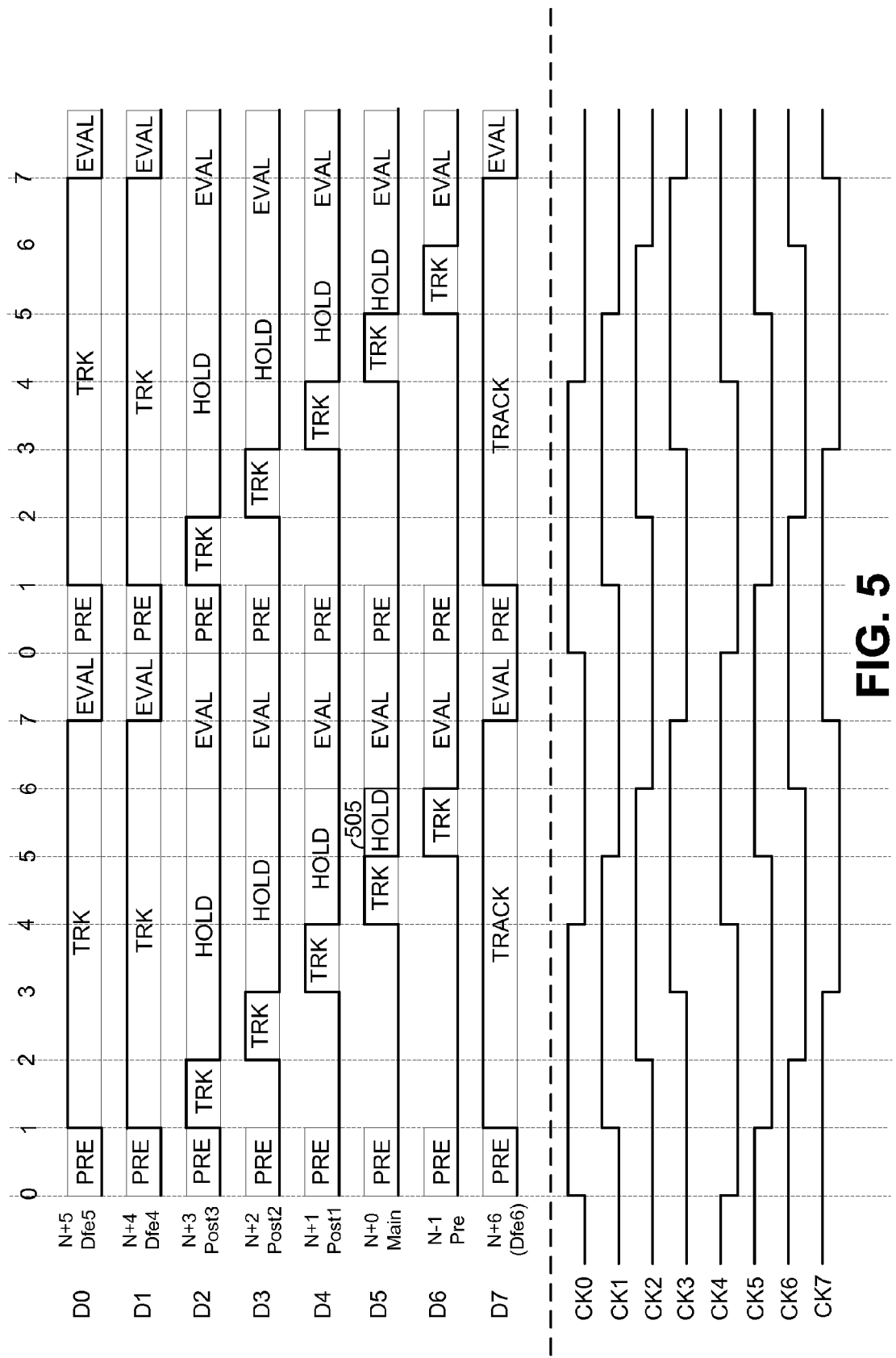

PIPELINED PROGRAMMABLE FEED FORWARD EQUALIZER (FFE) FOR A RECEIVER

BACKGROUND

A modern integrated circuit (IC) must meet very stringent design and performance specifications. In many applications for communication devices, transmit and receive signals are exchanged over communication channels. These communication channels include impairments that affect the quality of the signal that traverses them. One type of IC that uses both a transmit element and a receive element is referred to as a serializer/deserializer (SERDES). The transmit element on a SERDES typically sends information to a receiver on a different SERDES over a communication channel. The communication channel is typically located on a different structure from where the SERDES is located. To correct for impairments introduced by the communication channel, a transmitter and/or a receiver on a SERDES or other IC may include circuitry that performs channel equalization. Channel equalization is a broad term that comprises many different technologies for improving the accuracy of communication between a transmitter and a receiver. One typical type of equalization is referred to as decision feedback equalization and is performed by a decision feedback equalizer (DFE). A DFE is typically implemented in a receiver and improves the signal-to-noise ratio (SNR) of the signal, but it can suffer from burst error propagation.

A feed forward equalizer (FFE) does not suffer from burst error propagation, but nor does it provide the improvement in SNR as does a DFE.

Additionally, a DFE can only be utilized for post cursor equalization, where a FFE can be used for either or both of pre or post cursor equalization.

Further, current FFE implementations use a trans-conductance (gm) stage to implement, thus making such an implementation inefficient with respect to power consumption and die area.

Moreover, these drawbacks become more pronounced when attempting to design and fabricate a receiver that can operate using both PAM 2 and PAM 4 modalities. The acronym PAM refers to pulse amplitude modulation, which is a form of signal modulation where the message information is encoded into the amplitude of a series of signal pulses. PAM is an analog pulse modulation scheme in which the amplitude of a train of carrier pulses is varied according to the sample value of the message signal. A PAM 2 communication modality refers to a modulator that takes one bit at a time and maps the signal amplitude to one of two possible levels (two symbols), for example −1 volt and 1 volt. A PAM 4 communication modality refers to a modulator that takes two bits at a time and maps the signal amplitude to one of four possible levels (four symbols), for example −3 volts, −1 volt, 1 volt, and 3 volts. For a given baud rate, PAM 4 modulation can transmit up to twice the number of bits as PAM 2 modulation.

Therefore, it would be desirable to have a way to implement a FFE in a manner that maximizes power efficiency and that minimizes die area.

SUMMARY

In an embodiment, a programmable feed forward equalizer (FFE) includes a plurality of unit cells, each unit cell comprising a capacitive element coupled to an input connection by a first switch and coupled to an output connection by a second switch. The FFE also comprises clock logic configured to control the first switch and the second switch so that a selected voltage signal is applied to the capacitive element at a selected time such that the selected voltage signal defines a capacitance of the capacitive element, the clock logic causing the second switch to couple the capacitive element to the output connection so as to apply the selected voltage signal as a filter coefficient to a summing element.

Other embodiments are also provided. Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a timing diagram that can be used to control the operation of the programmable FFE of FIG. 4.

DETAILED DESCRIPTION

A pipelined programmable feed forward equalizer (FFE) for a receiver can be implemented in any integrated circuit (IC) that uses a digital direct conversion receiver (DCR). In an embodiment, the pipelined programmable FFE for a receiver is implemented in a serializer/deserializer (SERDES) receiver operating at a 50 gigabit per second (Gbps) data rate by implementing a pulse amplitude modulation (PAM) 4 modulation methodology operating at 25 GBaud (Gsymbols per second). The 50 Gbps data rate is enabled, at least in part, by the pipelined implementation to be described below, and is backward compatible with PAM 2 modulation methodologies operating at a data rate of 25 Gbps.

As used herein, the term "cursor" refers to a subject bit, the term "precursor" or "pre" refers to a bit that precedes the "cursor" bit and the term "postcursor" or "post" refers to a bit that is subsequent to the "cursor" bit.

Figure 1:
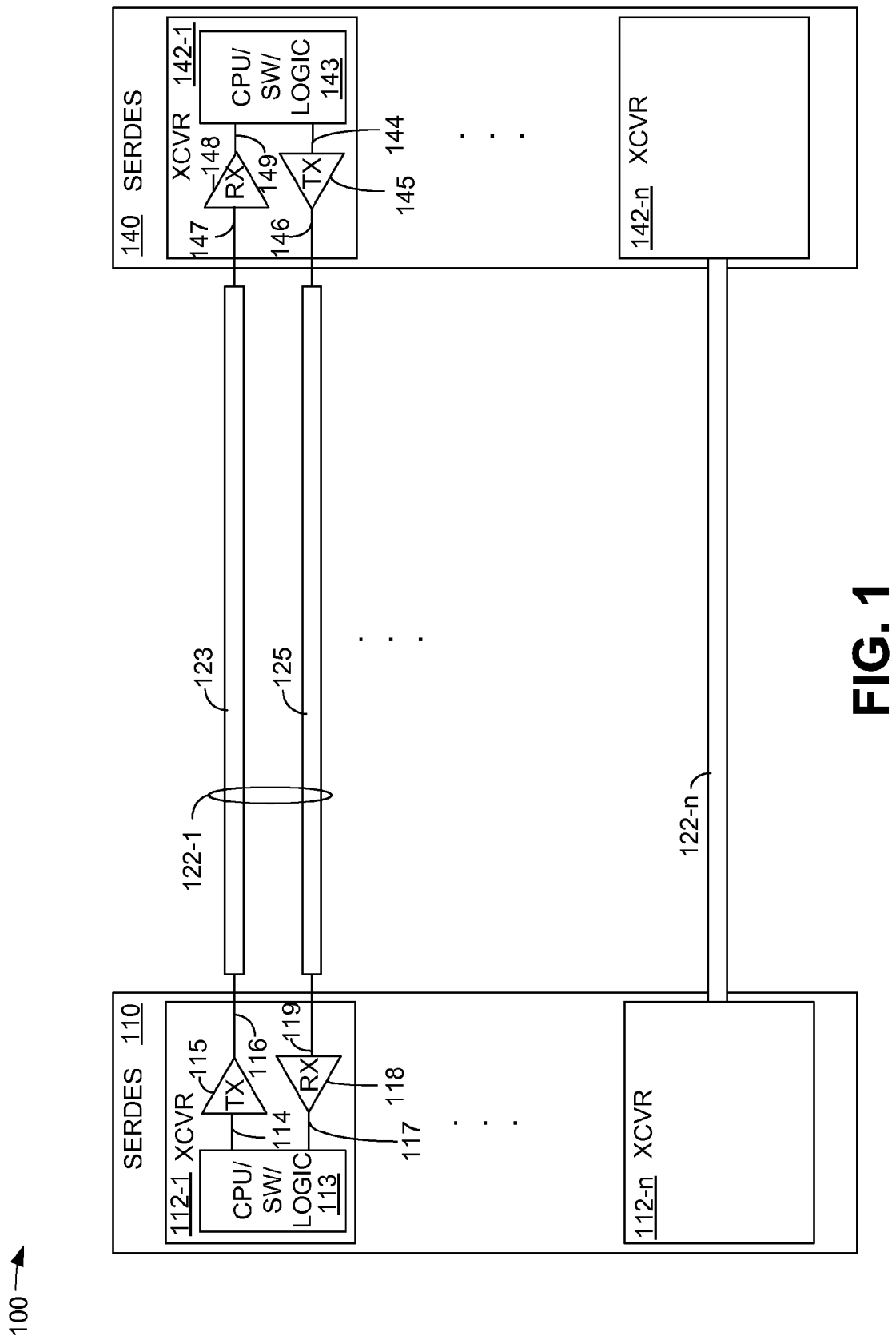
FIG. 1 is a schematic view illustrating an example of a communication system in which the pipelined programmable feed forward equalizer (FFE) for a receiver can be implemented.

FIG. 1 is a schematic view illustrating an example of a communication system 100 in which the pipelined programmable feed forward equalizer (FFE) for a receiver can be implemented. The communication system 100 is an example of one possible implementation. The communication system 100 comprises a serializer/deserializer (SERDES) 110 that includes a plurality of transceivers 112. Only one transceiver 112-1 is illustrated in detail, but it is understood that many transceivers 112-n can be included in the SERDES 110.

The transceiver 112-1 comprises a logic element 113, which includes the functionality of a central processor unit (CPU), software (SW) and general logic, and will be referred to as "logic" for simplicity. It should be noted that the depiction of the transceiver 112-1 is highly simplified and intended to illustrate only the basic components of a SERDES transceiver.

The transceiver 112-1 also comprises a transmitter 115 and a receiver 118. The transmitter 115 receives an information signal from the logic 113 over connection 114 and provides a transmit signal over connection 116. The receiver 118 receives an information signal over connection 119 and provides a processed information signal over connection 117 to the logic 113.

The system 100 also comprises a SERDES 140 that includes a plurality of transceivers 142. Only one transceiver 142-1 is illustrated in detail, but it is understood that many transceivers 142-n can be included in the SERDES 140.

The transceiver 142-1 comprises a logic element 143, which includes the functionality of a central processor unit (CPU), software (SW) and general logic, and will be referred to as "logic" for simplicity. It should be noted that the depiction of the transceiver 142-1 is highly simplified and intended to illustrate only the basic components of a SERDES transceiver.

The transceiver 142-1 also comprises a transmitter 145 and a receiver 148. The transmitter 145 receives an information signal from the logic 143 over connection 144 and provides a transmit signal over connection 146. The receiver 148 receives an information signal over connection 147 and provides a processed information signal over connection 149 to the logic 143.

The transceiver 112-1 is connected to the transceiver 142-1 over a communication channel 122-1. A similar communication channel 122-n connects the "n" transceiver 112-n to a corresponding "n" transceiver 142-n.

In an embodiment, the communication channel 122-1 can comprise communication paths 123 and 125. The communication path 123 can connect the transmitter 115 to the receiver 148 and the communication path 125 can connect the transmitter 145 to the receiver 118. The communication channel 122-1 can be adapted to a variety of communication methodologies including, but not limited to, single-ended, differential, or others, and can also be adapted to carry a variety of modulation methodologies including, for example, PAM 2, PAM 4 and others. In an embodiment, the receivers and transmitters operate on differential signals. Differential signals are those that are represented by two complementary signals on different conductors, with the term "differential" representing the difference between the two complementary signals. The two complementary signals can be referred to as the "true" or "t" signal and the "complement" or "c" signal. All differential signals also have what is referred to as a "common mode," which represents the average of the two differential signals. High-speed differential signaling offers many advantages, such as low noise and low power while providing a robust and high-speed data transmission.

Figure 2:
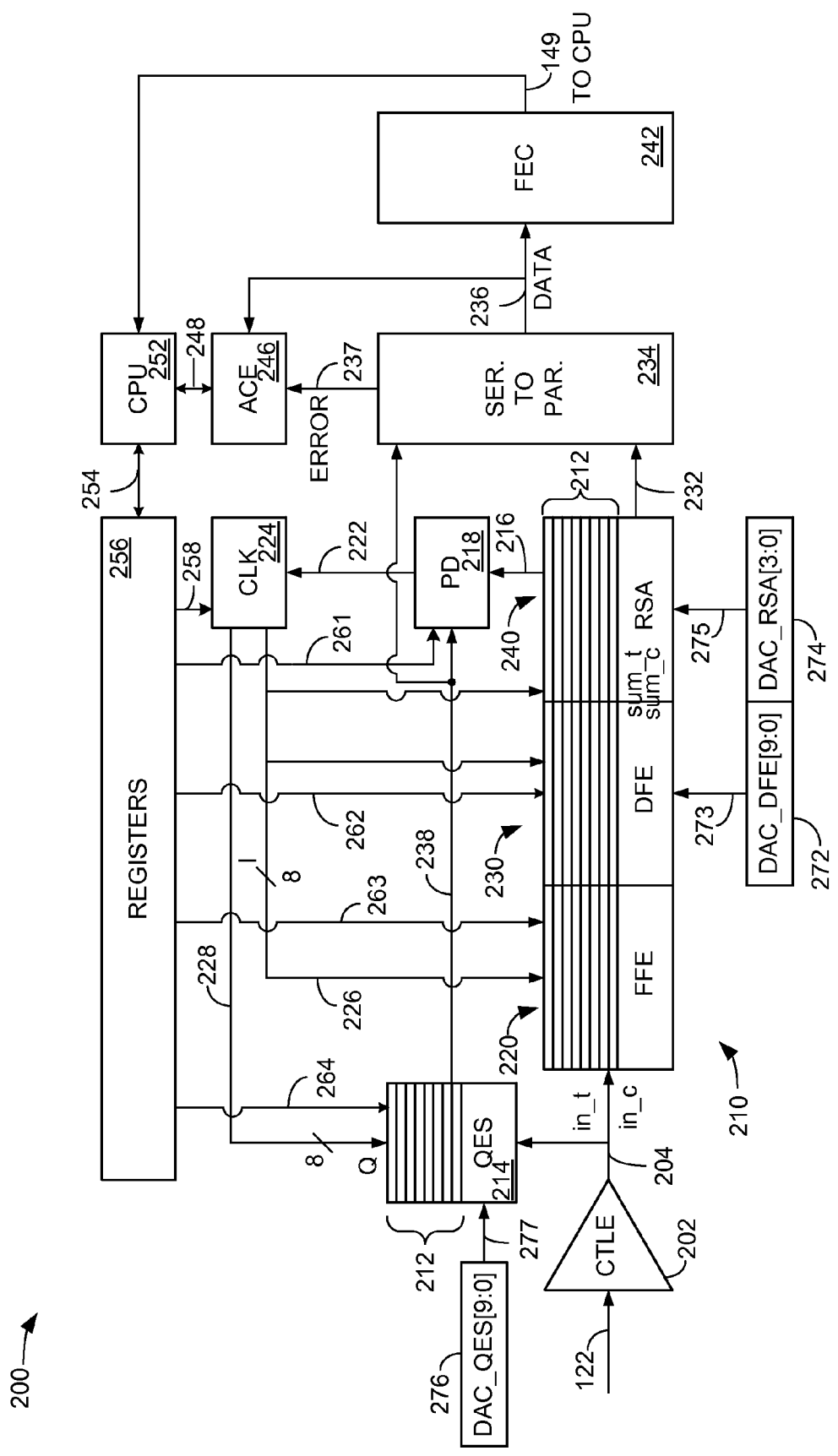
FIG. 2 is a schematic diagram illustrating an example receiver of FIG. 1.

FIG. 2 is a schematic diagram illustrating an example receiver of FIG. 1. The receiver 200 can be any of the receivers illustrated in FIG. 1. The receiver 200 comprises a continuous time linear equalizer (CTLE) 202 that receives the information signal from the communication channel 122 (FIG. 1). The output of the CTLE 202 is provided to a quadrature edge selection (QES) element 214 and to a pipelined processing system 210. The pipelined processing system 210 comprises a pipelined feed forward equalizer (FFE) 220, a pipelined decision feedback equalizer (DFE) 230 and a regenerative sense amplifier (RSA) 240.

The reference to a "pipelined" processing system refers to the ability of the FFE 220, the DFE 230, the RSA 240 and the QES 214 to process 8 pipelined stages 212 (referred to below as sections D0 through D7) simultaneously.

The DFE 230 receives a threshold voltage input from a digital-to-analog converter (DAC) 272 over connection 273. The RSA 240 receives a threshold voltage input from a digital-to-analog converter (DAC) 274 over connection 275. The DAC 272 and the DAC 274 can be any type of DAC that can supply a threshold voltage input based on system requirements.

The RSA 240 converts an analog voltage into a complementary digital value. The output of the RSA comprises sampled data/edge information and is provided over connection 216 to a phase detector (PD) 218. The output of the phase detector 218 comprises an update signal having, for example, an up/down command, and is provided over connection 222 to a clock (CLK) element 224. The clock element 224 provides an in-phase (I) clocking signal over connection 226 and provides a quadrature (Q) clocking signal over connection 228. The in-phase (I) clocking signal is provided to the pipelined FFE 220, the DFE 230, and to the RSA 240; and the quadrature (Q) clocking signal is provided to the QES element 214.

The QES element 214 receives a threshold voltage input from a DAC 276 over connection 277. The DAC 276 can be any type of DAC that can supply a threshold voltage input based on system requirements.

The output of the RSA 240 on connection 232 is a digital representation of the raw, high speed signal prior to extracting any line coding, forward error correction, or demodulation to recover data. In the case of PAM 2, the output is a sequence of ones and zeros. In the case of PAM N, it is a sequence of N binary encoded symbols. For example, for PAM 4, the output comprises a string of four distinct symbols each identified by a different two bit digital word. The output of the RSA 240 is provided over connection 232 to a serial-to-parallel converter 234. The serial-to-parallel converter 234 converts the high speed digital data stream on connection 232 to a lower speed bus of parallel data on connection 236. The output of the serial-to-parallel converter 234 on connection 236 is the parallel data signal and is provided to a forward error correction (FEC) element 242. The output of the serial-to-parallel converter 234 on connection 237 is an error, or test, signal and is provided to an automatic correlation engine (ACE) 246. The error, or test, signal is used to drive system parameters to increase signal-to-noise ratio in the receiver 200, and can be generated in several ways. One way is to use samplers inside the QES element 214 to identify zero crossings (also called edge data, or the transition between data bits). Another method is to use auxiliary samplers inside the RSA element 240 to identify the high amplitude signals (equivalent to the open part of an eye diagram). So, for example, using the edge data method, if a sampler inside the QES element 214 began to detect a positive signal where the zero crossing point should occur, then the ERROR signal on connection 237 would increase, and various system parameters could be driven to reduce that error. The output of the FEC 242 is provided over connection 149 to the CPU 252.

The output of the ACE 246 is provided over connection 248 to the CPU 252. The implementation of the ACE 246 could be done with hardware on chip, firmware off chip, or a combination of hardware and firmware, and a CPU, in which case the CPU 252 would read and write to the ACE 246 over connection 248. The ACE 246 compares the received data to a pseudorandom binary sequence (PRBS) pattern and provides a correlation function to support implementation of a least mean square (LMS) algorithm for tuning the receiver 200.

The CPU 252 is connected over a bi-directional link 254 to registers 256. The registers 256 store DFE filter coefficients, FFE controls, CTLE controls, RSA threshold voltage controls, offset correction values for the RSA and QES elements, and controls for the DACs.

An output of the registers 256 on connection 261 is provided to the phase detector 218, an output of the registers 256 on connection 262 is provided to the pipelined DFE 230, an output of the registers 256 on connection 263 is provided to the pipelined FFE 220 and an output of the registers 256 on connection 264 is provided to the QES element 214. Although not shown for simplicity of illustration, the registers 256 also provide control outputs to the CTLE 202 and to all the DACs. In an embodiment, the output of the QES element 214 on connection 238 comprises sampled data/edge information and is provided to the phase detector 218 and the serial-to-parallel converter 234.

The elements in FIG. 2 generally operate based on a system clock signal that runs at a particular frequency, which corresponds to the baud rate of the data channel. A time period, referred to as a unit interval (UI) generally corresponds to a time period of one clock cycle of the system clock. For example, a transceiver could be communicating at 50 Gbps, using PAM4, the baud rate is 25 G baud per second, and one UI would be 40 ps=1/25 G.

Generally, a receive signal on connection 204 is applied to an array of FFE/DFE/RSA/QES sections. If an array of N sections is implemented, then each section can process the receive signal at a rate of 1/(UI*N) which significantly relaxes power requirements compared to the standard (unpipelined) processing.

For example, a 25 Gbaud receive signal could be processed by an array of 8 sections, each section running at 3.125 GHz. The start time for each section is offset by 1 UI from its neighboring section, so that when the outputs from all 8 sections are summed together (signal 236), it is updated at the original 25 Gbaud rate.

Figure 3:
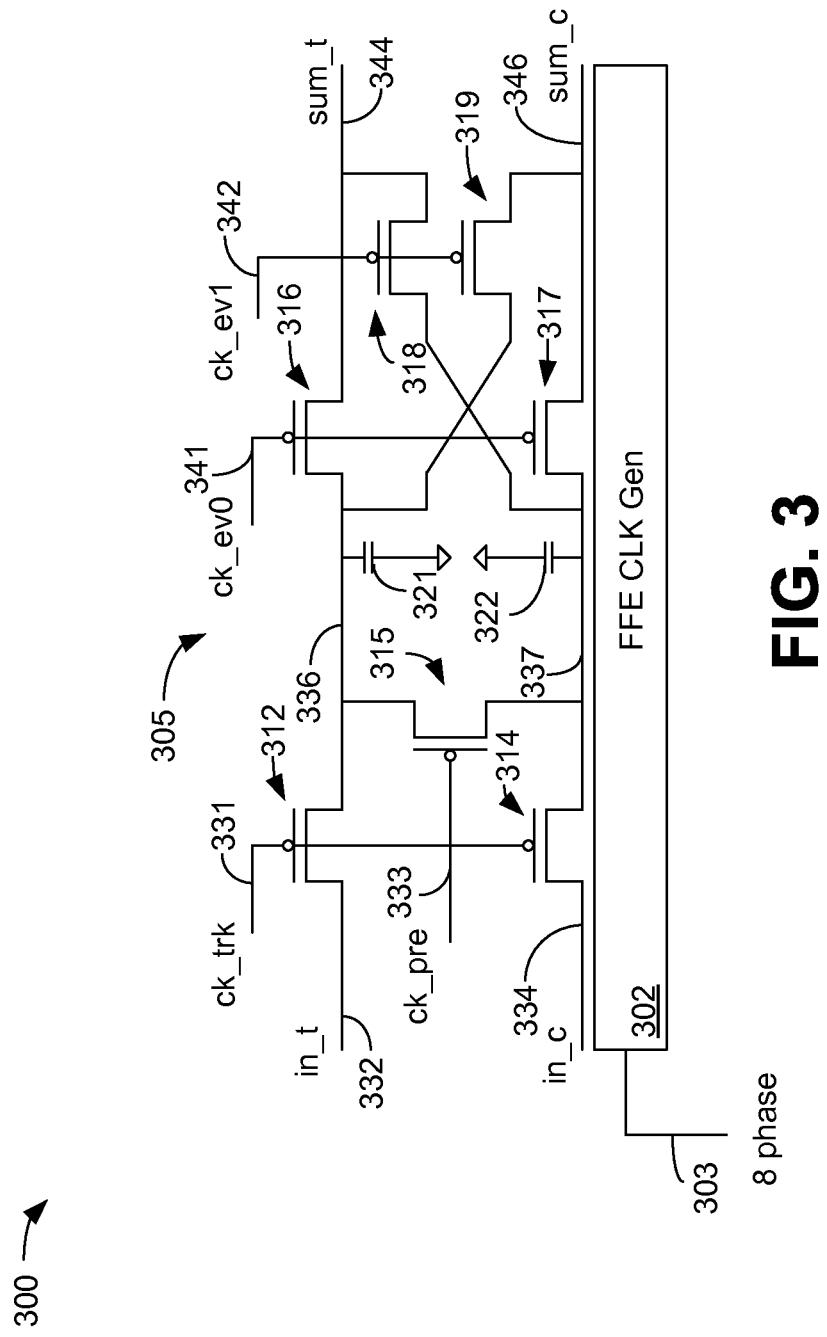
FIG. 3 is a schematic diagram of a unit cell of the FFE of FIG. 2.

FIG. 3 is a schematic diagram of a unit cell of the FFE 220 of FIG. 2. The FFE unit cell 300 comprises FFE clock generation logic 302 and switching logic 305. The switching logic 305 comprises switches 312, 314, 315, 316, 317, 318 and 319. The switches can be implemented using any switching technology including, for example, bipolar junction transistor (BJT) logic or any variation thereof, field effect transistor (FET) logic or any variation thereof, or any other available switching technology.

The FFE unit cell 300 also comprises a capacitor 321 and a capacitor 322. The FFE unit cell 300 is illustrated as operating on a differential signal with an input signal "in_t" provided on connection 332 and an input signal "in_c" provided on connection 334. The "in_t" signal and the "in_c" signal are the "true" and "complement" differential data outputs of the CTLE 202 of FIG. 2. The switches 312 and 314 receive a "track" clock signal "ck_trk", the switches 316 and 317 receive an "evaluation" clock signal "ck_ev0" and the switches 318 and 319 receive an "evaluation" clock signal "ck_ev1." The switch 315 receives a "precharge" clock signal "ck_pre" on connection 333. The "track" signal, the "evaluation" signal and the "precharge" signal will be described in greater detail below. The "true" output "sum_t" of the FFE unit cell 300 is provided over connection 344 and the "complement" output "sum_c" is provided over connection 346. The outputs "sum_t" and "sum_c" are provided to a summing element 422 (FIG. 4).

The clock generation logic 302 receives an 8-phase clock input signal on connection 303 and generates appropriate clock signals to allow the FFE unit cell 300 to switch at the appropriate time, and will be described in greater detail below.

Figure 4:
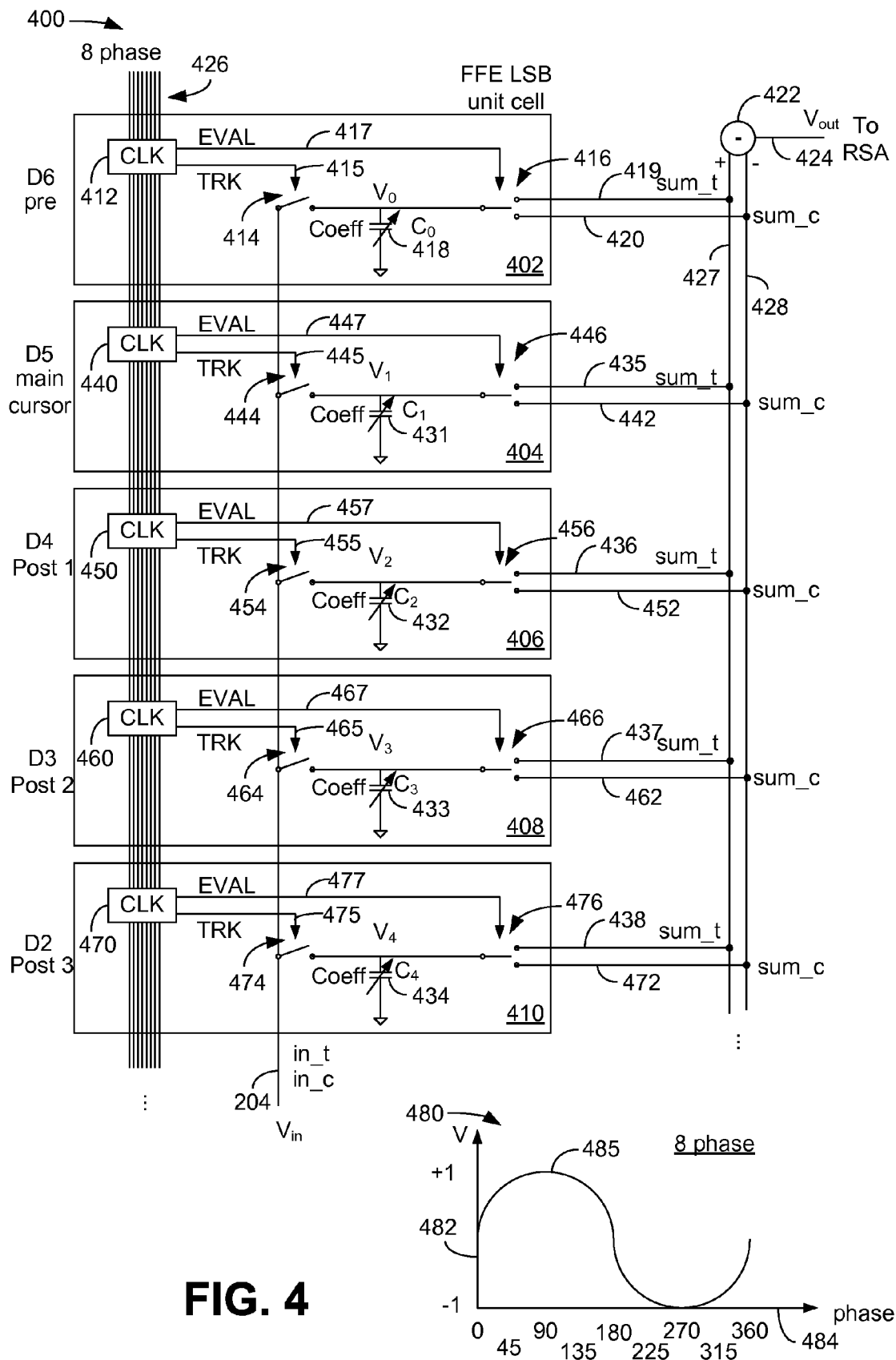
FIG. 4 is a block diagram illustrating a portion of a programmable FFE.

FIG. 4 is a block diagram illustrating a portion of a programmable FFE. FIG. 5 is a timing diagram that can be used to control the operation of the programmable FFE of FIG. 4. In this simplified example, the programmable FFE 400 represents one of eight pipelined parallel sections, with the section 400 comprising a plurality of FFE LSB (least significant bit) unit cells 402, 404, 406, 408 and 410. The FFE LSB unit cells 402, 404, 406, 408 and 410 can be similar to the FFE unit cell 300 described above, but are illustrated in FIG. 4 as a "single-ended" implementation using "positive logic" for ease of description. However, in an embodiment, the differential implementation shown in FIG. 3 uses PMOS (p-type metal oxide semiconductor) switches (where logic low or zero is ON, and logic high or one is OFF), so when the evaluation signal, "EVAL" is shown to transition to logic high in FIG. 5, it corresponds to the ck_ev0 (or ck_ev1) signal transitioning to logic low, in FIG. 3.

The FFE unit cell 402 comprises FFE clock generation logic 412, switches 414 and 416, and a capacitor 418. The capacitor 418 is illustrated as an adjustable capacitance as will be described below. An 8-phase clock signal is provided to the FFE clock generation logic 412 over an 8-phase clock bus 426. In the embodiment shown in FIG. 4, the FFE clock generation logic 412 provides a track signal, referred to as "TRK," over connection 415 to control the operation of the switch 414, and provides an evaluation signal, referred to as "EVAL," over connection 417 to control the operation of the switch 416. The FFE unit cells 404, 406, 408 and 410 are similar to the FFE unit cell 402 and will not be described in detail.

An input signal is provided to the FFE unit cells 402, 404, 406, 408 and 410 over connection 204, which is the "in_t" and "in_c" signals output of the CTLE 202 (FIG. 2). The output of the FFE unit cell 402 on connection 419 is the "sum_t" signal described in FIG. 3 and the output of the unit cell 402 on connection 420 is the "sum_c" signal described in FIG. 3. By operation of the switch 416, either the "sum_t" signal is provided to connection 427 or the "sum_c" signal is provided to connection 428. The "sum_t" signal and the "sum_c" signal are provided to a difference element 422. The output of the difference element 422 is provided over connection 424 to the RSA 240. The difference element 422 can also be referred to as a "summing node" in that it additively combines the "sum_t" signal on connection 427 and the "sum_c" signal on connection 428 to find the difference between those signals. In an embodiment, the summation can be done by shorting all of the FFE unit cell outputs on connections 427 and 428 together through a resistive short. However, other implementations of the difference element 422 can comprise active summation circuitry.

The sum_t signal on connection 419 and the sum_c signal on connection 420 is equivalent to the input signal on connection 204 modified by a programmable coefficient that is generated by operation of the FFE clock generation logic 412 selecting a subset of 8 available clock phases from the 8-phase clock input signal on the 8 phase clock bus 426 that is provided to the FFE unit cell 402, and similarly provided, to the FFE clock generation logic 440, 450, 460 and 470 in the FFE unit cells 404, 406, 408 and 410, respectively.

The FFE clock generation logic 412 uses a subset of clock phases (generated by using selected combinations) of the 8-phase clock input signal on the 8 phase clock bus 426 to generate the TRK signal on connection 415 and the EVAL signal on connection 417. The FFE clock generation logic 412 also generates a precharge signal, referred to as "PRE", which is not shown in FIG. 4. The PRE signal is used to precharge the capacitor 418 (and similarly, the capacitors 431, 432, 433 and 434). The FFE 400 is one of eight parallel sections of the pipelined programmable FFE 220 (FIG. 2). One of the eight parallel sections (for example, the FFE section 400) would use clock phases 0->1, 4->5, and 6->0 in order to generate the PRE, TRK, and EVAL signal pulses. The nomenclature "6->0" refers to a signal pulse that starts at a rising edge of clock phase 6 "CK6 " (FIG. 5) and ends on the rising edge of clock phase 1 "CK1" (FIG. 5). A neighboring instance of the FFE 400 (not shown) would operate on the identical logic as shown in FIG. 4 to drive the PRE, TRK and EVAL signals, but it would be operating on a shifted set of the 8 clock phases. So, the neighboring instance of the FFE 400 would use clock phases 1->2, 5->6, and 7->1 to generate the PRE, TRK and EVAL signals. Each successive section of FFE 400 would be responsive to a shift in the clock phases in a similar manner, and so would have it's main cursor sampling 1 UI later than a previous FFE section. After 8 FFE sections process the input signal, the clock phases return to the original, and have completed one complete phase. The graph 480 illustrates such a phase having 8 sampled clock phases.

The specific phases selected from the 8 phase clock signal on bus 426 define the time that the voltage at the input 204 is sampled onto the capacitor 418 (and the capacitors 431, 432, 433 and 434), through switch 414 (and the switches 444, 454, 464 and 474), and later through the switch 416 (and switches 446, 456, 466 and 476) and applied to the summing node 422.

With particular regard to the FFE unit cell 402, but applicable to the unit cells 404, 406, 408 and 410, the FFE clock generation logic 412 controls the operation of the switches 414 and 416 to control and determine the time that the input voltage on connection 204 is applied to the capacitor 418, thus adjustably controlling, or programming, the value of the capacitor 418, and thus determining the value of the coefficient on connection 419 or connection 420. The time that the input voltage is applied to the capacitors 431, 432, 433 and 434, is similarly controlled by respective FFE clock generation logic 440, 450, 460 and 470, thus determining the total value of the signal on connection 424. Similarly, by adjusting the number of FFE LSB unit cells enabled for each cursor, the FFE 220 provides a widely adjustable coefficient to the input signal on connection 204.

The value of the signal on connection 424 is generated by multiplying the input signal (Vin) on connection 204 by a coefficient (Coeff, corresponding to the value of each capacitance $C_0$ through $C_4$, in this embodiment) to generate the output (Vout), so Vout=Coeff*Vin. In such an example, the value of the "Coeff" is set by the size of the capacitor 418 (and 431, 432, 433 and 434). However, in an alternative embodiment, the value of the coefficient (Coeff) can be determined by enabling or disabling FFE LSB cells (more cells in parallel is equivalent to one cell with a bigger capacitor), or by changing whether an FFE LSB cell provides an output to sum_t, or to sum_c. For example, if an FFE unit cell provides an output to sum_c, it is applying a negative coefficient, and if it provides an output to sum_t is applying a positive coefficient. In an embodiment, a combination of these three methodologies is used to generate the overall value on connection 424.

In the example of FIG. 4 having five FFE unit cells, the value of the coefficient applied to the input signal, Vin, is given by $(C_0V_0+C_1V_1+C_2V_2+C_3V_3+C_4V_4)/(\text{Ctotal})$. The value of each capacitor 418, 431, 432, 433 and 434 is fixed (and programmable by virtue of the registers 256) and the value of the voltage across each capacitor 418, 431, 432, 433 and 434 is determined by the value of the voltage at the input on connection 204, at the specific time that each FFE unit cell samples the input on connection 204, as controlled by the FFE clock generation logic associated with each FFE unit cell.

With regard to the FFE unit cell 402, but applicable to the FFE unit cells 404, 406, 408 and 410, the FFE clock generation logic 412 controls the timing of the switches 414 and 416 and the registers 256 (FIG. 2) control the polarity of the switch 416 (to determine whether the capacitor 418 is applied to sum_t or sum_c, and can enable or disable any unit FFE cell via connection 263 (FIG. 2). Together, the FFE clock generation logic 412 and the registers 256 enable a programmable feed forward equalization of the input signal on connection 204, with the equalized output provided at the summing node 422. In this embodiment, the FFE clock generation logic 412 is configured to sample the input on connection 204 through the switch 414, onto capacitor 418 ($C_0$), during the UI before the main cursor (the precursor). By enabling or disabling FFE LSB cells that are configured to sample the precursor (D6), more or less of the precursor component of the input signal can be programmed into the output of the FFE section 400. An alternative way of programming the output of the FFE section 400 can be done by increasing or decreasing the size of the capacitor 418 ($C_0$). The polarity of the EVAL signal controls the sign of each FFE LSB cell's contribution to the output on connections 427 and 428. In this embodiment, the voltage $V_0$ is a copy of the input signal on connection 204 during the precursor time interval (D6), the voltage $V_1$ is the main cursor at time interval D5, the voltage $V_2$ is the first postcursor (D4), the voltage $V_3$ is the second postcursor (D3), and the voltage $V_4$ is the third postcursor (D2). The adjustable amount that each cursor is scaled, then delivered to the output of the equalizer on connection 424, is determined by the total capacitance used to sample each cursor. The capacitance $C_0$ scales the precursor (D6), the capacitance $C_1$ scales the main cursor (D5), the capacitance $C_2$ scales the first postcursor (D4), the capacitance $C_3$ scales the second postcursor (D3), and the capacitance $C_4$ scales the third postcursor (D2). Additionally, the polarity of the EVAL signal controls the switch 416 (and the respective switches 446, 456, 466 and 476) to determine whether each cursor's contribution is positive or negative. The resulting output of the FFE section 400 is $(C_0V_0+C_1V_1+C_2V_2+C_3V_3+C_4V_4)/(\text{Ctotal})$ where each coefficient $C_0 \ldots C_4$ can be positive or negative, and has a value based on the total capacitance used to sample the given cursor.

A graphical example of the input signal provided to the FFE clock generation logic 412 is shown in the graph 480. The vertical axis 482 of the graph 480 refers to relative amplitude in volts (V), with a normalized value range of between −1V and +1V. The horizontal axis 484 refers to the phase of the signal on connection 426. The signal on connection 426 is sampled at 45 degree intervals to generate the 8 clock phases in one clock cycle represented by the trace 485. The FFE clock generation logic in each FFE unit cell selects the appropriate subset of the 8 clock phases to control the operation of each FFE unit cell 402, 404, 406, 408 and 410 to apply a selectable coefficient to the input via respective capacitors 418, 431, 432, 433 and 434, to generate a widely programmable equalized output voltage on connection 424. In an embodiment, the FFE clock generation logic 412 can be implemented as a 1:8 demultiplexer, where each of the 8 outputs is a signal that is separated in phase from each adjoining output by 45 degrees and having a different voltage value.

The input signal on connection 204 to the FFE cells 402, 404, 406, 408 and 410 will be described in conjunction with the timing diagram of FIG. 5. The timing diagram 500 illustrates an example of 8 clock phases being used to control the operation of the programmable FFE 400 of FIG. 4, as an example. The signal traces "CK0" through "CK7" refer to the clock signals being applied to the FFE clock generation logic 412 on the 8-phase clock bus 426 to control the programmability of the capacitors associated with each FFE unit cell shown in FIG. 4.

The traces labeled "D0" through "D7" in FIG. 5 correspond to sections of FFE unit cells (FIG. 4) that are programmed by the FFE clock generation logic based on the clock signals CK0 through CK7 which sample the input signal on connection 204 on specific cursors (pre (D6), main (D5), post1 (D4), etc.) that are related to the clock phases as shown in the timing diagram of FIG. 5. In the example of FIG. 4 and FIG. 5, the traces D0 through D7 refer to sections of the FFE 220 and DFE 230, with the FFE portion 400 shown in FIG. 4 as an example of the FFE 220 that operates on the cursors "pre (D6)," "main (D5)," "post 1 (D4)," "post 2 (D3)," and "post 3 (D2)" according to the 8 phase clock. The timing provided by the FFE clock generation logic 412 (illustrated by the available clock signals CK0 through CK7) determines which cursor (D0 through D7) corresponds to which clock signal (CK0 through CK7), and the timing of the action of each unit cell (FIG. 4) on the input signal on connection 204. The repeating periods "0" through "7" along the top of FIG. 5 refer to system clock intervals, and are each referred to as a 'UI' or unit interval of the system clock. The term "PRE" refers to a period during which the capacitors in each unit cell (e.g., the capacitors 321 and 332 in the differential unit cell shown in FIG. 3, and the capacitors 418, 431, 432, 433 and 434 shown in the unit cells of FIG. 4) are precharged. In an embodiment, the capacitors (e.g., the capacitors 321 and 322 in the differential unit cell shown in FIG. 3, and the capacitors 418, 431, 432, 433 and 434 shown in the single-ended implementation in FIG. 4) are precharged by connecting them together. During the "PRE" period, capacitors 321 and 322 (FIG. 3) are pre-charged by shorting them together by closing the switch 315 so they have zero differential voltage. In the single-ended implementation shown in FIG. 4, the two capacitors 321 and 322 of FIG. 3 are functionally equivalent to the capacitor 418 and to the capacitors 431, 432, 433 and 434 for unit cells 404, 406, 408 and 410, respectively. In FIG. 4, the "PRE" period would be equivalent to shorting the capacitor 418 to ground. More generally, the pre-charging switches could connect the capacitors to voltages other than zero, for example to shift the summing node voltage to be inside the range of the RSA, if necessary.

The terms "TRK" or "TRACK" refer to a tracking period during which the capacitor is connected to the input 204 to allow the capacitor to be charged to the input voltage on connection 204. Referring to FIG. 3, the clock signal "ck_trk" is applied to the switches 312 and 314 to charge the capacitors 321 and 322. Referring to FIG. 4, the switch 414 (and the other switches at the inputs to the unit cells 404, 406, 408 and 410) is closed so the capacitor 418 (and capacitors 431, 432, 433 and 434) is connected to the input voltage on connection 204.

The term "HOLD" refers to a hold period during which the capacitor is decoupled from the input node 204, and thus from the charging voltage and is allowed to remain in a charged state.

The term "EVAL" refers to an evaluation period during which the capacitors are coupled to the summing node 422. Referring to FIG. 3, the clock signal "ck_ev0" is applied to the switches 316 and 317; or the clock signal "ck_ev1" is applied to the switches 318 and 319 such that the values of the capacitors 321 and 322 are applied to the connections 344 and 346, to the summing node 422 and then to the RSA 240. The sign of the coefficient that each FFE LSB cell 402, 404, 406, 408 and 410 is contributing is controlled by which ck_ev signal ("ckev0" or "ckev1") is enabled. In an embodiment, the signal "ck_ev0" applies a positive coefficient and the signal "ck_ev1" applies a negative coefficient. The number of FFE LSB cells 402, 404, 406, 408 and 410 enabled inside each FFE cursor (D2, D3, D4, D5, etc.) determines the magnitude of that coefficient.

As shown in FIG. 5, data corresponding to the main cursor sampled into the FFE unit cell 404 associated with trace D5 is held for one (1) UI, as shown by reference numeral 505 to allow the precursor bit sampled into FFE unit cell 402 associated with trace D6 to be brought into the programmable FFE 400 and be applied to the summing node 422 as described above.

By selecting the number of FFE LSB cells to enable for each cursor, and selecting the sign of the EVAL signals in those selected cells, an FFE filter function is implemented. The clock signals determine the time that each FFE LSB unit cell will sample the input on connection 204 thus determining which cursor on which FFE LSB unit cell will sample the input. In addition, the registers 256 provide control signals that enable more/less of each cursor to be applied to the summing node by controlling each FFE LSB cell to use the ck_ev0 or ck_ev1 signals to determine whether the coefficient is positive or negative. The registers 256 control whether the signal ck_ev0 or the signal ck_ev1 will be connected to the capacitor in each unit cell, and the FFE clock generation logic 412 circuit applies the input at the right time, using selected phases of the 8 phase clock.

The track (TRK) periods in each FFE unit cell should be aligned with specific cursors used for the equalizer. In the implementation described herein, there are five UIs (five FFE LSB unit cells in FIG. 4) during which the input on connection 204 can be sampled. In the implementation described herein, the selected cursors are the "pre", "main", "post1", "post2", and "post3" cursors, but more generally, it is possible to operate on the main cursor, and then four pre or post cursors as desired for that particular system.

This disclosure describes the invention in detail using illustrative embodiments. However, it is to be understood that the invention defined by the appended claims is not limited to the precise embodiments described.

What is claimed is:

1. A receiver, comprising:
a programmable feed forward equalizer (FFE) that receives an input signal from a linear equalizer, comprising:
a plurality of unit cells, each unit cell comprising a capacitive element coupled to an input connection by a first switch and coupled to an output connection by a second switch;
clock logic configured to control the first switch and the second switch so that a selected voltage signal is applied to the capacitive element at a selected time such that the selected voltage signal defines a capacitance of the capacitive element; and
the clock logic causing the second switch to couple the capacitive element to the output connection so as to apply the selected voltage signal as a filter coefficient to a summing element.

2. The programmable FFE of claim 1, wherein a value of the filter coefficient is determined by one or more of a value of the capacitive element, enabling one or more of the plurality of unit cells, and determining a sign of the filter coefficient.

3. The programmable FFE of claim 1, wherein the clock logic determines the selected voltage signal by selecting a subset of eight phases of a clock signal and a phase of the selected voltage signal determines the voltage applied to the capacitive element.

4. The programmable FFE of claim 1, wherein the capacitive element comprises two capacitive elements configured to process a differential signal.

5. The programmable FFE of claim 1, wherein a first input sample is provided to a first unit cell and a second input sample is provided to a second unit cell, the first input sample offset from the second input sample by one unit interval of a system clock.

6. The programmable FFE of claim 5, wherein the first input sample is held in the first unit cell while the second input is provided to the second unit cell.

7. The programmable FFE of claim 1, wherein a first input sample is provided to a first unit cell and a second input sample is provided to a second unit cell, the first input sample offset from the second input sample by one unit interval of a system clock, wherein the first input sample is held in the first unit cell while the second input is provided to the second unit cell, and wherein the clock logic determines the selected voltage signal by selecting a subset of eight phases of a clock signal and a phase of the selected voltage signal determines the voltage applied to the capacitive element.

8. A method, comprising:
providing an input signal to a plurality of unit cells belonging to a programmable feed forward equalizer (FFE), each unit cell comprising a capacitive element coupled to an input connection by a first switch and coupled to an output connection by a second switch;
controlling the first switch and the second switch so that a selected voltage signal is applied to the capacitive element at a selected time such that the selected voltage signal defines a capacitance of the capacitive element; and
causing the second switch to couple the capacitive element to the output connection so as to apply the selected voltage signal as a filter coefficient to a summing element.

9. The method of claim 8, further comprising determining a value of the filter coefficient by one or more of selecting a value of the capacitive element, enabling one or more of the plurality of unit cells, and determining a sign of the filter coefficient.

10. The method of claim 8, further comprising determining the selected voltage signal by selecting a subset of eight phases of a clock signal and a phase of the selected voltage signal determines the voltage applied to the capacitive element.

11. The method of claim 8, wherein the capacitive element comprises two capacitive elements configured to process a differential signal.

12. The method of claim 8, further comprising:
providing a first input sample to a first unit cell and providing a second input sample to a second unit cell, the first input sample offset from the second input sample by one unit interval of a system clock.

13. The method of claim 12, further comprising holding the first input sample in the first unit cell while the second input is provided to the second unit cell.

14. A receiver, comprising:
a linear equalizer configured to develop an input signal for a feed forward equalizer (FFE);
the FFE comprising:
a plurality of unit cells, each unit cell comprising a capacitive element coupled to an input connection by a first switch and coupled to an output connection by a second switch;
clock logic configured to control the first switch and the second switch so that a selected voltage signal is applied to the capacitive element at a selected time such that the selected voltage signal defines a capacitance of the capacitive element; and
the clock logic causing the second switch to couple the capacitive element to the output connection so as to apply the selected voltage signal as a filter coefficient to a summing element.

15. The receiver of claim 14, wherein a value of the filter coefficient is determined by one or more of a value of the capacitive element, enabling one or more of the plurality of unit cells, and determining a sign of the filter coefficient.

16. The receiver of claim 14, wherein the clock logic determines the selected voltage signal by selecting a subset of eight phases of a clock signal and a phase of the selected voltage signal determines the voltage applied to the capacitive element.

17. The receiver of claim 14, wherein the capacitive element comprises two capacitive elements configured to process a differential signal.

18. The receiver of claim 14, wherein a first input sample is provided to a first unit cell and a second input sample is provided to a second unit cell, the first input sample offset from the second input sample by one unit interval of a system clock.

19. The receiver of claim 18, wherein the first input sample is held in the first unit cell while the second input is provided to the second unit cell.

20. The receiver of claim 14, wherein the clock logic determines the selected voltage signal by selecting a subset of eight phases of a clock signal and a phase of the selected voltage signal determines the voltage applied to the capacitive element, wherein a first input sample is provided to a first unit cell and a second input sample is provided to a second unit cell, the first input sample offset from the second input sample by one unit interval of a system clock, and wherein the first input sample is held in the first unit cell while the second input is provided to the second unit cell.

\* \* \* \* \*